United States Patent

Jennings et al.

Patent Number: 6,156,222
Date of Patent: Dec. 5, 2000

[54] POLY-PERFLUOROALKYL SUBSTITUTED POLYAMINES AS GREASE PROOFING AGENTS FOR PAPER AND FOAM STABILIZERS IN AQUEOUS FIRE-FIGHTING FOAMS

[75] Inventors: John Jennings, Bronx, N.Y.; Ted Deisenroth, Mobile, Ala.; Marlon Haniff, West Orange, N.J.

[73] Assignee: Ciba Specialty Chemicals Corporation, Tarrytown, N.Y.

[21] Appl. No.: 09/234,251

[22] Filed: Jan. 20, 1999

Related U.S. Application Data

[60] Provisional application No. 60/084,815, May 8, 1998.

[51] Int. Cl.[7] ............ A62D 1/04; C07C 229/00; C07C 211/00
[52] U.S. Cl. ............ 252/8.05; 252/2; 562/561; 562/564; 562/574; 564/509; 564/510; 564/511
[58] Field of Search ............ 252/2, 8.05; 562/561, 562/564, 574; 564/509, 510, 511

[56] References Cited

U.S. PATENT DOCUMENTS

| | | |
|---|---|---|
| 3,671,493 | 6/1972 | Lo Monaco et al. . |
| 3,952,060 | 4/1976 | Huber-Emden et al. . |

(List continued on next page.)

FOREIGN PATENT DOCUMENTS

| | | |
|---|---|---|
| 2018461 | 4/1970 | Germany . |

(List continued on next page.)

OTHER PUBLICATIONS

Derwent Abstr. 1984–267124 [43]for JP 59164073.

*Primary Examiner*—Joseph D. Anthony
*Attorney, Agent, or Firm*—Kevin T. Mansfield

[57] ABSTRACT

Perfluoroalkyl-allyloxy- and perfluoroalkyl-iodopropyloxy-substituted polyaminoacids or poly-$R_F$-fluoroallyl-substituted polyaminoacids which contain, in random distribution, q units of A-1, r units of A-2, s units of A-3 and t units of A-4 in which A-1 and A-2 are perfluoroalkyl-substituted amino groups of the formulae

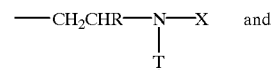
(A-1)

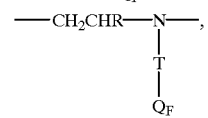

(A-2)

A-3 is a hydrophilically substituted amino or amido group of the formula

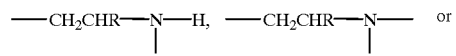

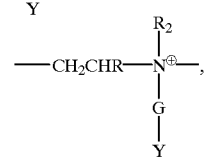

and A-4 is a substituted amino or amido group of the formula

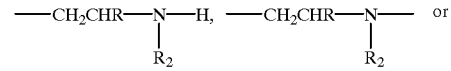

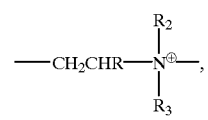

where the variables are as defined herein, are useful to provide oil repellency to paper and as foam stabilizers in alcohol resistant—aqueous fire-fighting foam fire-fighting foam compositions.

13 Claims, 1 Drawing Sheet

U.S. PATENT DOCUMENTS 5,491,261  2/1996  Haniff et al. ............................ 562/582
5,750,043  5/1998  Clark .......................................... 252/2

FOREIGN PATENT DOCUMENTS 1214528  12/1970  United Kingdom .
94/18245  8/1994  WIPO .

POLY-PERFLUOROALKYL SUBSTITUTED POLYAMINES AS GREASE PROOFING AGENTS FOR PAPER AND FOAM STABILIZERS IN AQUEOUS FIRE-FIGHTING FOAMS

This application claims the benefit under 35 U.S.C. 119(e) of U.S. Provisional Application No. 60/084,815, filed May 8, 1998.

FIELD OF THE INVENTION

This invention relates to perfluoroalkyl-modified polyethyleneimines, more particularly to water soluble poly-perfluoroalkyl-(allyloxy/iodopropyloxy)- or poly-perfluoroalkyl-fluoroallyl-substituted polyethyleneimines which are useful as oil repellents for substrates such as textiles and paper and as foam stabilizers in Alcohol Resistant - Aqueous Fire-Fighting Foam (AR-AFFF) formulations.

BACKGROUND OF THE INVENTION

Aqueous Fire-Fighting Foam (AFFF) formulations contain water-soluble fluorosurfactants along with hydrocarbon surfactants. They are effective in extinguishing non-polar solvent fires. When an AFFF formulation comes in contact with a burning hydrocarbon fuel, the water, which contains both fluoro- and hydrocarbon surfactants, drains from the foam and forms a thin film on top of the burning fuel. This film does not sink, but due to its low surface energy (<18 dynes/cm, which is lower than that of heptane), it spontaneously spreads across the surface of the burning fuel. There it acts as a vapor suppressant and, in combination with the aqueous foam, extinguishes the fire and prevents reignition of the fuel. It is important in this application that the foam have a long foam life on the hot fuel; otherwise the fuel can reignite, an event called burnback. A long foam life which provides burnback resistance is achieved by having a foam which is "wet", that is hydrated, and from which water can drain down onto the surface and replenish the seal. On a non-polar fuel like gasoline, this task is simple, since water and the water-soluble surfactants are not soluble in the fuel.

This task is considerably more difficult on polar fuels like isopropanol and acetone. Besides the fluoro- and hydrocarbon surfactants found in regular AFFF formulation, an Alcohol-Resistant (=AR) AFFF formulation contains a fluorochemical water-soluble but polar-solvent insoluble—also referred to as "alcoholophobic"—foam stabilizer (as described in this invention) along with a polysaccharide such as xanthan gum. When these additives come in contact with a burning polar fuel fire, they precipitate and give rise to a membrane which protects the foam from dissolving in the polar solvent. This membrane creates a vapor barrier which extinguishes the fire and prevents reignition of the fuel along with keeping the foam hydrated. Polysaccharides and/or high molecular weight synthetic polymers may be used in AR-AFFF formulations without a fluorochemical foam stabilizer and provide the same efficacy. The problem with a foam concentrate containing only polysaccharides and/or high molecular weight synthetic polymers is that its viscosity is high and the concentrate behaves in a thixotropic manner. It is difficult to use a high viscosity foam concentrate since it is hard if not impossible to pump through a fire nozzle. AR-AFFF formulations containing fluorochemical foam stabilizers require much lower amounts of polysaccharides and/or high molecular weight synthetic polymers, thus lowering the viscosity of the foam concentrate. Additionally, foam concentrates containing fluorochemical foam stabilizers in AR-AFFF formulations tend to behave in a Newtonian manner.

Fire fighting foam stabilizers containing at least one perfluoroalkyl group and water solubilizing functionalities such as carboxy and amido groups are described in U.S. Pat. Nos. 4,460,480 and in 5,218,021. French patent application 2637506-A describes an alcoholophobic and oleophobic fire extinguishing foam concentrate containing a polyhydroxy-polyamine containing at least one quaternary N atom and/or a polysaccharide which are chemically bonded to highly fluorinated $C_4$–$C_{20}$alkyl groups, instead of containing the fluorosurfactant separately and the polysaccharide or other alcoholophobic agent in the concentrated mixture.

Alcoholophobic fire fighting foam stabilizers containing at least one perfluoroalkyl group along with poly-quaternary amino and carboxy functionalities are described in world patents applications WO 9002110 A1 and WO 9003966 A1 along with publications by S. Szönyi in Fire Safety Journal, 16, pp. 353–365 (1990) and Progress in Colloid & Polymer Science, 81, 136–139 (1990).

Since quaternary amino groups cause incompatibility with the anionic surfactants used in fire fighting formulations, further improvements have been described in WO 94/18245. This reference teaches compounds which contain a combination of at least two perfluoroalkyl groups, amino groups other than quaternary amino groups, carboxylic groups and other water-solubilizing groups attached to amino groups. For example, U.S. Pat. No. 4,606,973 discloses aminoethylmethacrylate-acrylic acid copolymers in which the amino groups have been reacted with perfluoroalkyl carboxylic acids.

S. Szönyi, Com. Journ. Corn. Esp. Deterg., 22, pp. 297–304 (1991) describes a commercial state-of-the-art alcoholophobic foam stabilizer as a perfluoroalkylated polyamino acid.

An especially practical way to combine amino groups essential to foam stabilization with perfluoroalkyl-substituted compounds is to use readily available polyethyleneimine. The usefulness of polyethyleneimines in foam stabilizer formulations for polar solvent fires has been known for some time. For example, Japanese patent application S59-230566 describes useful foam stabilizers for polar solvents containing an anionic or amphoteric fluorosurfactant, polyethyleneimine of MW 4,000–100,000, and a polybasic acid compound.

U.S. Pat. No. 3,769,307 claims perfluoroalkylsubstituted polyethyleneimine compositions and the preparation thereof. This patent goes further to claim the use of such compounds as new textile finishes providing oleophobic properties. German Offenlegungsschrift 2 018 461 describes surface-active agents and foam stabilizers for polyurethane foams which are polyethyleneimines substituted by one or more perfluoroalkyl groups, as well as perfluoroalkyl-substituted polyamines containing up to 16 carboxy or sulfonic acid groups and/or hydrophilic amide groups. Although not directed toward foam stabilizer compounds for polar solvent fire fighting foams, the composition of this patent is described as very soluble in alcohol/water mixtures, but poorly soluble in alcohol (="alcoholophobic") and water itself, making it a candidate for such foam stabilizers. Indeed, the above cited WO 94/18245 reference describes the synthesis of a perfluoroalkyl- and carboxy-substituted polyethyleneimine from tetraethylene-pentamine, a perfluoroalkyl acyl chloride and chloroacetic acid.

Japanese laid open patent application 59-164073 discloses reaction products of polyethyleneimine and anionic fluorinated surfactants, providing the acidic and fluorinated component for effective foam stabilizers on polar solvents.

World patent application WO 96/05889 A1 also describes foam stabilizers consisting of polyamines having perfluoroalkyl groups attached to the polyamine through ester linkages, and containing additional hydrophilic groups and optionally a non-perfluoroalkyl hydrophobic group.

Effective foam stabilizers on polar solvents have to be essentially insoluble in these solvents. They most commonly are poly-perfluoroalkyl-substituted polyamino acid compounds, such as those described above. The present invention discloses compounds useful as foam stabilizers for fire-fighting foams used on polar-solvent fires which are polyethyleneimine derivatives containing anionic and nonionic water-solubilizing groups, and further substituted with a mixture of perfluoroalkyl-allyloxy and perfluoroalkyl-iodopropyloxy groups or poly-perfluoroalkyl-fluoroallyl groups.

Mono-perfluoroalkyl ($=R_F$) substituted amino acids have long been known to be excellent amphoteric surfactants, reducing the surface tension of water to as low as 16 dynes/cm. Such compounds, obtained by the reaction of an $R_F$-ethylthiol, maleic anhydride and a di- tri- or tetra amine and containing up to two $R_F$, carboxy- and amino groups are described for instance in U.S. Pat. Nos. 4,069,244 and 4,161,602. Di- and poly-$R_F$-polyamino acids obtained by reaction of a di-$R_F$-diol with a dianhydride and a diamine and containing 2-6 $R_F$-groups, 4–10 carboxy and two tertiary amino groups are described in U.S. Pat. No. 4,153,590. These amphoteric compounds have been found useful as surface-active agents and film formers in aqueous and resin formulations.

Another class of amphoteric compounds with similar properties and also containing $R_F$-, acid and amino groups, and which are useful to impart oil repellency to paper products are di-$R_F$-amino acids obtained by reaction of an amino acid, allyl glycidyl ether and $R_F$-iodide as described in U.S. Pat. No. 5,491,261. This synthetic route, using an $R_F$-iodide rather than an $R_F$-thiol as the starting material, is more cost-effective, since it can be carried out in higher yields and produces much less waste.

It has now been discovered that by a similar route polymeric $R_F$-amines, including polymeric $R_F$-amino acids of the type which are useful as foam stabilizers for polar solvent fire-fighting foams, and which contain a plurality of $R_F$ groups as well as amino, and carboxy or other hydrophilic groups, can conveniently be prepared in similarly high yields and essentially without waste from a polymer containing a plurality of primary and/or secondary amino groups and a plurality of acid groups, by reaction with allyl glycidyl ether (=AGE) followed by addition of $R_F$-iodide and partial dehydrohalogenation. The resulting mixture of poly-perfluoroalkyl-allyloxy—and poly-perfluoroalkyl-iodopropyl-substituted-polyamino acids are useful as grease-proofing agents for paper, but more importantly, they have been found to act as excellent foam stabilizers for Aqueous Fire-Fighting Foam (AFFF) formulations used on polar solvent fires.

Similar compounds, which are poly-perfluoroalkyl-fluoroallyl-substituted-polyamino acids and which are excellent foam stabilizers for AR-AFFF agents can be prepared by reaction of polyethyleneimines with a perfluoroalkylethyl iodide, followed by reaction with aminoreactive acid compounds such as chloroacetic acid or succinic anhydride. This reaction is believed to proceed through a perfluoroalkylethylene intermediate and subsequent elimination of HF, resulting in a 3-perfluoroalkyl-2-fluoro-allylamine structure. The addition reaction of perfluoroalkylethylenes to primary and secondary amines is described in U.S. Pat. Nos. 3,535,381 and 4,853,141.

It has also been found that the acid functionality is not essential to the performance of the compounds, but can be replaced by other hydrophilic groups, such as amide and/or hydroxy groups. Nonionically-substituted poly-$R_F$-polyethyleneimines were furthermore found to give superior performance with saltwater; likewise, phosphoric acid-substituted poly-$R_F$-polyethylene-imines were found to give superior performance with saltwater. Performance when mixed with saltwater is a major concern in firefighting operations aboard ships and in harbors.

The use of nonionically-substituted and phosphoric acid substituted poly-$R_F$-polyethyleneimines as foam stabilizers in salt water fire-fighting foam formulations is thus another object of this invention.

DETAILED DISCLOSURE

The paper sizing chemicals and foam stabilizers of this invention are perfluoroalkyl-allyloxy- and perfluoroalkyl-iodopropyloxy-substituted polyaminoacids or poly-$R_F$-fluoroallyl-substituted polyaminoacids which contain, in random distribution, q units of A-1, r units of A-2, s units of A-3 and t units of A-4 in which A-1 and A-2 are perfluoroalkyl-substituted amino groups of the formulae

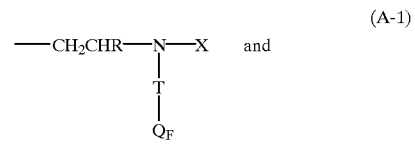

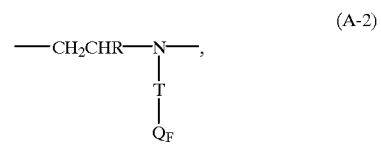

A-3 is a hydrophilically substituted amino or amido group of the formula

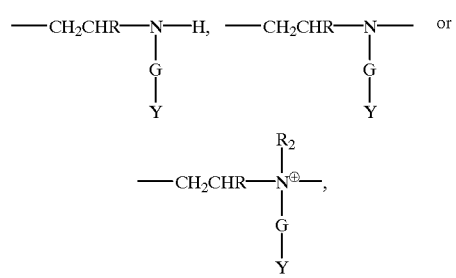

and A-4 is a substituted amino or amido group of the formula

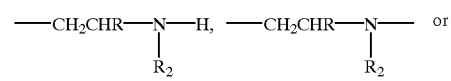

-continued

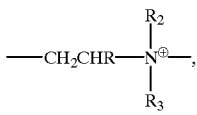

wherein

T is —CH$_2$CH(OH)CH$_2$—O—CH$_2$— or a direct bond, with the proviso that when T is —CH$_2$CH(OH)CH$_2$—O—CH$_2$—, Q$_F$ is of the formulae —CHI—CH$_2$—R$_F$ (Q$_{F1}$) and —CH=CH—R$_F$ (Q$_{F2}$)

and consists of 5–50 mole % Q$_{F1}$ and 50–95 mole % Q$_{F2}$, and, when T is a direct bond, Q$_F$, is

—CH$_2$CH=CF—R$_F$'(Q$_{F3}$), q, r, s, and t are integers from zero to 100, the sum of q+r+s+t is 5 to 200, the sum of q+r is equal to or greater than 2, and the ratio of q+r/s is 0.1 to 2, R is hydrogen or methyl, R$_F$ is independently a monovalent perfluorinated alkyl or alkenyl, linear or branched organic radical having four to twenty fully fluorinated carbon atoms, R$_F$' is independently a monovalent perfluorinated alkyl or alkenyl, linear or branched organic radical having three to nineteen fully fluorinated carbon atoms, with each R$_F$ and R$_F$' radical being identical or different from the other R$_F$ and R$_F$' radicals, X is hydrogen, —CH$_2$CH(OH)CH$_2$—O—CH$_2$CH=CH$_2$ or —G—Y, G is a direct bond or a linking group of the formula —CH$_2$—, —CH$_2$CHR—, —CH$_2$—CH$_2$C$_6$H$_4$—, —CH$_2$CH$_2$CH$_2$—, —C$_6$H$_4$—, —CH(—COOH)CH$_2$—, —CH$_2$CH$_2$CONHCH(OH)—, —COR$_1$—, —CH$_2$CHRCONHC(CH$_3$)$_2$(CH$_2$)—, or a mixture thereof, wherein R is as defined above, R$_1$ is —CH=CH—, —CH$_2$CH$_2$—, or —C$_6$H$_4$— and Y is an acid group of the formula —COOH, —SO$_3$H, —PO$_3$H$_2$, or —(PO$_3$H)$_3$H, or a salt thereof, or is —CONH$_2$ or —CH(OH)CH$_2$OH, or a mixture of these groups, R$_2$ is an alkyl radical with 1 to 20 carbon atoms, or is —CH$_2$CH$_2$CON(CH$_3$)$_2$, CH$_2$CH$_2$CONHCH$_2$OH, —CH$_2$CH$_2$CON(CH$_2$OH)$_2$, —CH$_2$CH$_2$N(R$_4$)$_2$, —CH$_2$CR$_1$—COOR$_4$ or —CH$_2$CH(OH)CH$_2$—O—CH$_2$CH=CH$_2$, wherein R$_4$ is an alkyl radical with 1 to 18 carbon atoms or —CH$_2$CH$_2$—OH, R$_3$ is the same as R$_2$ or is hydrogen, and R$_1$ is defined as above.

Preferred are compounds as described above wherein Q$_F$ consists of 10–40% Q$_{F1}$ and 60–90% Q$_{F2}$, or is Q$_{F3}$, R$_F$ is saturated and contains 6–12 carbon atoms, is fully fluorinated and contains at least one terminal perfluoromethyl group, R$_F$' is saturated and contains 5–11 carbon atoms, is fully fluorinated and contains at least one terminal perfluoromethyl group q+r is 2 to 20, s is 5 to 80 and the ratio of q+r/s is 0.05 to 0.5, t is 0 to 5, R is hydrogen, R$_2$ is —CH$_2$CH(OH)CH$_2$—O—CH$_2$CH=CH$_2$, R$_3$ is hydrogen or —CH$_2$CH(OH)CH$_2$—O—CH$_2$CH=CH$_2$, Y is as defined above and G is a direct bond or is of the formula —CH$_2$—, —CH$_2$CH$_2$—, —CH$_2$CH$_2$CONHCH(OH)—, —CH$_2$—CH$_2$C$_6$H$_4$—, —CH(—COOH)CH— or —COR$_1$—, where R$_1$ is —CH$_2$CH$_2$—.

Particularly preferred are compounds as described above wherein Q$_F$, T, R$_F$, R$_F$', q, r, s, t, R, R$_1$, R$_2$, and G are as defined above and Y is —COOH or —CONH$_2$, with compounds wherein Q$_F$ is Q$_{F1}$ and Q$_{F2}$ and consists of 10–40% Q$_{F1}$ and 60–90% Q$_{F2}$, T is —CH$_2$CH(OH)CH$_2$—O—CH$_2$— and wherein G is —CH$_2$— and Y is —COOH being especially preferred.

Also especially preferred are compounds wherein Q$_F$ is Q$_{F3}$, T is a direct bond, G is —CH$_2$— and Y is —COOH.

Also particularly preferred are compounds as described above wherein Q$_F$, T, R$_F$, R$_F$', q, r, s, t, R, R$_1$and R$_2$, are as defined above, G is —CH$_2$CH$_2$— or —CH$_2$—CH$_2$C$_6$H$_4$— and Y is —SO$_3$H.

Also particularly preferred are compounds as described above wherein Q$_F$, T, R$_F$, R$_F$', q, r, s, t, R, R$_1$ and R$_2$ are as defined above, G is —CH$_2$CH$_2$— and Y is —PO$_3$H.

Also particularly preferred are compounds as described above wherein Q$_F$, T, R$_F$, R$_F$', q, r, s, t, R, R$_1$ and R$_2$ are as defined above, G is a direct bond and Y is —(PO$_3$H)$_3$H, —COOH or —CH(OH)CH$_2$OH.

The novel poly-R$_F$-(allyloxy/iodopropoxy) polyamines of this invention are obtained by first reacting allyl glycidyl ether with a part of the primary or secondary amino groups of a precursor polyamine polymer; then reacting this polyallyloxy-substituted polyamino prepolymer with an amino-reactive organic or inorganic acidic compound or other hydrophilic compound, and then reacting the product of this reaction with a perfluoroalkyl iodide.

The novel poly-R$_F$-fluoroallyl-substituted polyaminoacids are obtained by reaction of a polyamine with a perfluoroalkylethyl iodide either before or after reaction with an amino-reactive acid or other hydrophilic compound. Due to the basic nature of the reaction medium, HI is eliminated and a perfluoroalkylethylene is formed as an intermediate, which adds to an amino group. During this reaction one equivalent of HF is eliminated; therefore the resulting perfluoroalkyl group (=Q$_{F3}$) contains one fewer —CF$_2$— unit than do the corresponding Q$_{F1}$ and Q$_{F2}$ groups.

The reaction is carried out in a high boiling polar solvent, preferably a glycol such as ethylene-, propylene- or hexylene-glycol at temperatures of 90–120° C. over a period of three to twenty hours.

Useful amino-reactive acidic compounds are halogenated carboxylic or sulfonic acids or their salts of the formula X'-G-Y, which react by substitution of X', wherein X' is halogen, preferably chlorine or bromine and G and Y are defined as above. Preferred compounds are chloroacetic acid, chloropropionic acid and chlorosulfonic acid and their salts. Also suitable are vinyl unsaturated acids which react via a Michael addition reaction such as acrylic acid, itaconic acid, vinyl sulfonic acid and vinyl phosphonic acid, 2-acrylamido-2-methylpropane sulfonic acid and 2-acrylamido glycolic acid. Anhydrides which react by amide formation such as maleic-, succinic- or phthalic anhydrides, and sodium meta-triphosphate are also useful.

Useful amino-reactive non-ionic hydrophilic compounds are oxiranes and chloroacylamides such as glycidol and chloroacetamide.

The reaction of the polyallyloxy polyamino prepolymer with an amino-reactive organic or inorganic acidic compound or other hydrophilic compound proceeds readily at temperatures of 40 to 75° C. The acids or acid salts can be added in a solvent, or preferably neat. Useful solvents are water and alcohols, such as n-propanol, 2-propanol and hexylene glycol.

Preferred reactants are α-halo acids and their salts, with sodium chloroacetate being most preferred. Also preferred are α,β-unsaturated acids, with acrylic acid being most preferred. Also preferred are maleic- and succinic anhydrides and cyclic sodium meta-triphosphate, and mixtures of glycidol and chloroacetamide.

The reaction is carried out under either aqueous or anhydrous conditions, and the addition of a catalyst is not required.

These amino-reactive compounds can be used alone or in combination with each other. Alternatively, the amino-reactive hydrophilic compounds can be added to the polyamine before the addition of the allyl glycidyl ether. In this case, a solvent is advantageously employed. Water is the preferred solvent. Allyl glycidyl ether is then added, preferably neat or in solution using a solvent such as propanol.

The final product is obtained by the reaction of a perfluoroalkyl iodide with the prepolymer in the presence of a free radical initiator such as an azo compound or peroxide at appropriate initiation temperatures, preferably at temperatures of between 50 and 80° C. Sodium metabisulfite is preferably present to reduce iodine to iodide.

Solvents can be present; for example ketones such as acetone, methyl ethyl ketone or methyl propyl ketone or alcohols such as ethanol, propanol or butanol. If a solvent is used, it may be distilled off before dilution of the reaction mixture with water. The reaction is typically carried out over 4 to 10 hours at 50–80° C. with good agitation. The resulting product mixture is diluted with sufficient deionized water to adjust the solids content to 15 to 40% by weight and the fluorine content to 4 to 10%.

Due to the basic nature of the reaction medium, much of the organic iodide is eliminated during the course of the reaction. The prepolymer is therefore obtained as a mixture having iodopropoxy and allyloxy linkages to the perfluoroalkyl moieties. If complete elimination of the organic iodide is desired, the addition of a strong inorganic base such as sodium or potassium hydroxide or a strong organic base such as 1,8-diazabicyclo(5.4.0)-undec-7-ene (DBU) is necessary.

It has further been found that the $R_F$-I addition to the allyloxy groups can be carried out using sodium dithionite, at temperatures between 0 and 20° C. Huang (Chin. J. Chem. 4, 350 and 358,(1990); Macromol Symp. 82, 67, 1994) teaches that the use of one equivalent of dithionite based on $R_F$-I is necessary to add $R_F$-I to terminally unsaturated compounds. It has been unexpectedly found that only 0.02 to 0.5 equivalents, preferably 0.05 to 0.2 equivalents, are sufficient to achieve essentially complete addition to an allyloxy-substituted polyaminoacid. An advantage of this process is that less color is produced and more organically bound iodine is retained. In addition the process can be carried out at higher aqueous dilutions. Carrying out the addition of $R_F$-I to terminal double bonds in an aqueous solution containing 4–40% by weight of a water-soluble solvent such as a $C_1$–$C_4$ alcohol, an amide such as dimethylform-amide, or a ketone at 0 to 40° C., in the presence of 0.02 to 0.5 equivalents, preferably 0.05 to 0.2 equivalents, based on $R_F$-I, of dithionite ion is thus another subject of this invention.

Useful polyamine starting materials have number average molecular weights ranging from about 200 to 10,000. They are typically polyalkyleneimines containing 4 to 300 primary, secondary and tertiary amino groups in ratios ranging from 1:1:0 to 1:2:1. Preferred are polyethyleneimines having molecular weights of 1000 to 5000. These polyamine starting materials are commercially available.

The following examples illustrate various embodiments of the invention, and are not to be interpreted as limiting the scope of the appended claims. In the examples, all parts are by weight unless otherwise specified. Perfluoroalkyl iodides $C_nF_{2n+1}$-I with n=4 to 14 were obtained from DuPont under the product names ZONYL® TELA-L and ZONYL®TELA-N. They have the following average telomer distributions:

ZONYL®TELA-L: $C_4$=4% maximum, $C_6$=50±3%, $C_8$=29±2%, $C_{10}$=11±2%, $C_{12}$=4±1%, $C_{14}$ and higher= 2% maximum.

ZONYL®TELA-N: $C_6$=6% max, $C_8$=50±3%, $C_{10}$= 29±2%, $C_{12}$=11±1%, $C_{14}$ and higher=4% maximum, respectively.

The corresponding perfluoroalkylethyl iodides, $C_nF_{2n+1}$—$CH_2CH_2I$, are available from DuPont under the product name ZONYL®TELB-L and TELB-N and have essentially the same telomer chain length distribution as TELA-L and -N.

When the compounds of this invention are used as oil proofing agents for paper, they are applied to the paper or paper board as an external coating by any conventional method such as padding, spraying or in a size press in amounts to deposit from 0.02 to 0.5% fluorine by weight on the paper. In addition to the fluorochemical, any of the conventional binders used in the paper industry—such as polymeric latex binders, carboxymethyl cellulose and polyvinyl alcohol—and sizing agents, such as ionic and nonionic starches like ethoxylated and oxidized starches, and water sizing agents such as alkyl-ketene-dimer (AKD) or alkyl-succinic anhydride (ASA) can be present.

In the following examples, external sizing application was accomplished using the following procedure: the products were applied to 34# waterleaf paper stock using a Werner Mathis laboratory padder in the horizontal mode. Samples were co-applied with 2% Penford 280 starch as sizing agent and Chel®DPTA 41 (from Ciba Specialty Chemicals Corp.) as a chelating agent in the standard manner. The paper was dried for 30 seconds on each side at 100° C. using a photographic drier.

The oil repellency of a surface is determined by using the TAPPI UM 557 OIL KIT TEST. This test method consists of applying twelve different mixtures of castor oil/heptane/ toluene having a surface tension range from 34.5 to 22.0 dynes/cm. The rating is based on penetration that occurs within 15 seconds of application; the ratings go from 1 (lowest), to 12.

As taught in column 2 of U.S. Pat. No. 5,496,475, the teachings of which are incorporated by reference, AFFF and AR-AFFF agents are generally sold in the form of liquid concentrates. These concentrates, which are rather complex mixtures (see column 7, lines 9–36), are diluted with fresh or salt water in proportioning equipment and sprayed onto a burning liquid as a foam.

The agents are usually sold as so-called "3X6" and "3X3" AR-AFFF concentrates, with the trend in the industry being toward the latter, where the numbers indicate the percent by weight of the concentrate contained in the diluted formulation for a fighting a fire involving a nonpolar fuel such as gasoline or a polar fuel, respectively.

When the inventive compounds are used as the foam stabilizer in an AR-AFFF agent, they are added to conventional AFFF and AR-AFFF formulations. The amount of the foam stabilizers typically used in 3X3 AR-AFFF agents ranges from 1% to 4% by weight of the active ingredients. From 10 up to about 40% of the fluorine of the final formulation is thus derived from the foam stabilizer.

In order to test the efficacy of the novel foam stabilizers the following basic AR-AFFF formulation, free of any foam stabilizer, was used:

| | |
|---|---|
| Lodyne ® F-102R, from Ciba Specialty Chemicals | 5.6% |
| Lodyne ® F-204R, from Ciba Specialty Chemicals | 2.4% |
| Mirataine ®-H2C-HA, from Rhone-Poulenc | 16% |
| Sipex ® OLS, from Alcolac | 1.8% |
| Triton ® X-102, from Rohm & Haas Comp. | 0.8% |
| Butyl carbitol | 10% |
| Keltrol ® BT, from Kelco Comp. | 1.5% |

This mixture is referred to in the examples as AR-AFFF base.

Measurements of Foam Expansion Ratio (FXR) and Quarter Drain Time (QDT) were performed using the following procedure. A 3% solution of AR-AFFF was prepared in sea or tap water. The test solution was drawn into the calibrated liquid container by vacuum; see FIG. 1 below. The volume of the test solution was adjusted to 100 ml. The test solution was pressurized to 40 psi with compressed nitrogen. Compressed air was turned on and adjusted to 33 psi. The test solution was mixed with air at the mixing port before foaming at the nozzle. The volume of foam was measured in a 1000 ml graduated cylinder. The Foam Expansion Ratio of the foam was determined as the ratio of the total foam volume to the volume of the original test solution. Quarter Drain Time was measured as the time it took to collect 25 ml of drained liquid from the foam. Each test measurement was duplicated and the average was reported.

Foam Life on hot 2-Propanol was measured using the following procedure. A 3% solution of AR-AFFF was prepared in sea or tap water. The test solution was loaded in the calibrated liquid container by using vacuum, see FIG. 1 below. The volume of the test solution was adjusted to 75 ml. The test solution was pressurized to 40 psi with compressed nitrogen. Compressed air was turned on at 33 psi. The test solution was mixed with air at the mixing port before foaming at the nozzle. To a glass Pyrex pan 6.5 inches X 10 inches was added 250 ml of 2-propanol at 70° C. The test solution was discharged as foam onto the hot 2-propanol and formed a blanket completely covering its surface. Foam Life was measured as the time it took for 50% of the foam area to collapse. Each test measurement was duplicated and the average was reported.

Analytical Methods

Figure 1:
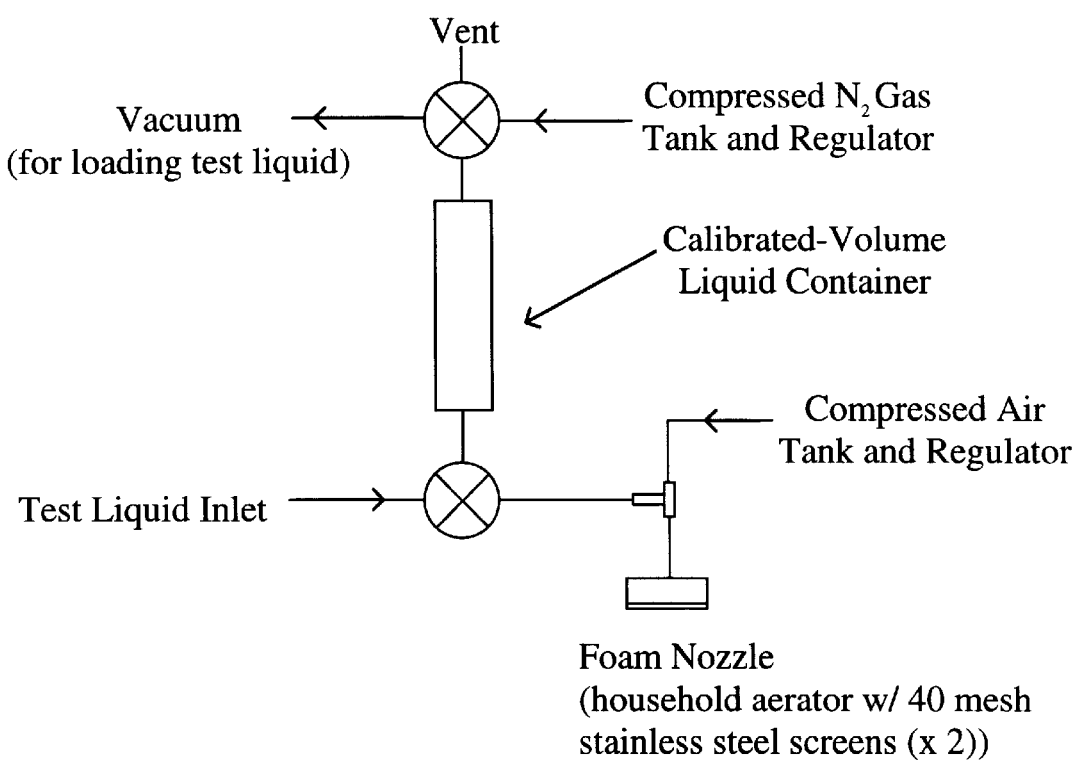
FIG. 1 represents a mode of carrying out the invention.

Progress of the reaction of allyl glycidyl ether with polyethylenimine was followed by gas chromatography. The reaction was allowed to continue until allyl glycidyl ether was no longer detected.

ZONYL®TELA-L consumption was also followed by gas chromatography using an HP 5890 GC and a Supelco SPB-1, 60 mesh/0.53 mm by 3.0 m column with FID detector.

Determination of Ionic Chloride and Iodide was done by titration as described below: Equipment: Brinkmann Auto Titrator, Model E436; Fisher Ag/AgCl Reference Electrode; Fisher Silver Billet Indicating Electrode; Aldrich Standard AgCl.

Procedure: 1) Weigh about a 0.2 g sample for chloride or 1.0 g for iodide into a 200 ml Beaker and dilute with 150 ml of water and add 1 ml of glacial acetic acid. 2) Titrate with 0.1023 M $AgNO_3$ at 750 mv and a speed of "2".

Calculation:

$$\% \text{Conversion(based on Cl}^-) = \frac{\text{ml} \times \text{M} \times (\text{Total } Rxn \text{ Mass}) \times 100\%}{(\text{g sample})(\text{mmol of Chloroacetic acid})}$$

$$\% \text{Conversion(based on 1}-) = \frac{\text{ml} \times \text{M} \times (\text{Total } Rxn \text{ Mass}) \times 100\%}{(\text{g sample})(\text{mmol of } R_F l)}$$

EXAMPLE 1

A: Synthesis of poly-(N-2-hydroxy-4-oxa-6,7-ene heptyl) polyethyleneimine (=Poly-allyloxy-PEI).

100.0 g (83.3 mmol) of polyethyleneimine, Mn 1200 (Epomin®SP-012 from Nippon Shokubai Co.) and 25.0 g of deionized water are placed into a round-bottomed flask equipped with a stirrer, nitrogen inlet and a thermoregulator. This mixture is heated with stirring. When a temperature of 65° C. is reached, 28.5 g (250 mmol) allyl glycidyl ether are added over a one hour period. The reaction mixture is then stirred for two hours at 65° C. Consumption of allyl glycidyl ether is monitored by gas chromatography. Typically this product is not isolated but used directly in the next step.

B: Synthesis of poly-N-2-hydroxy-4-oxa-[6,7-ene and-6-iodo-]-7-$R_F$-heptyl-N-carboxymethylene poly-(ethyleneimine) (=poly-$R_F$-PEI-carboxylic acid).

15.0 g (24.4 mmol) of the prepolymer from Example 1A are placed into a round-bottomed flask equipped with a stirrer, nitrogen inlet and a thermoregulator and heated. When the temperature reaches 40° C., 18.0 g (154 mmol) of chloroacetic acid sodium salt and 5.0 g of deionized water are added to the flask. A temperature increase from 40° C. to 100° C. is observed. When the rise in temperature subsides, the reaction mixture is maintained at 75° C. for three hours with stirring. Completion of reaction is determined by chloride titration with silver nitrate. The temperature is then raised to 80° C., and 12.78 g (22.0 mmol) of perfluoroalkyl iodide (ZONYL TELA-N) and 0.46 g (2.4 mmol) of sodium metabisulfite are added along with 0.19 g (1 mmol) of 2,2'-azobisisobutyronitrile (AIBN). After one hour, 3.5 g of deionized water is added to lower the viscosity of the mixture. Stirring is continued for five hours at 80° C. After five hours the mixture is cooled to room temperature and water is added to adjust the solids to 28% by weight, and 5.0% F. Conversion of $R_F$-iodide, as determined by gas chromatography, is 95%.

EXAMPLES 2 and 3

Following the procedure of Example 1, products are synthesized with the ratios of sodium chloroacetate and perfluoroalkyl iodide as outlined in Table 1.

EXAMPLE 4

A: Synthesis of Poly-allyloxy-PEI)

100.0 g (83.3 mmol) of polyethyleneimine, Mn 1200 (Epomin®SP-012 from Aceto Corporation) and 25.0 g of deionized water are placed into a round-bottomed flask equipped with a stirrer, nitrogen inlet and a thermoregulator. The temperature of the reaction mixture is increased to 65° C. and 19.0 g (167 mmol) of allyl glycidyl ether is added over approximately one hour. The reaction mixture is stirred for two hours at 65° C., after which time conversion of allyl glycidyl ether is complete, as monitored by gas chromatography. This product is not isolated but used directly in the next step.

B: Synthesis of poly-$R_F$-PEI-carboxylic acid 15.0 g (17.4 mmol) of the prepolymer from Example 4A is placed into a round-bottomed flask equipped with a stirrer, nitrogen inlet and a thermoregulator. To this round-bottomed flask is added 20.2 g (174 mmol) of chloroacetic acid sodium salt and 5.0 g of deionized water. The reaction mixture is heated to 75° C. and stirred for three hours. At the end of three hours, 9.09 g (15.6 mmol) of ZONYL TELA-N is added to the reaction mixture along with 0.33 g (1.7 mmol) of sodium metabisulfite and 0.13 g (0.69 mmol) of 2,2'-azobisisobutyronitrile (AIBN). The reaction mixture is stirred under nitrogen at 80° C. for five hours. After five hours the mixture is cooled to room temperature and water is added to adjust the solids to 27% by weight, and 3.5% F. The conversion of $R_F$-iodide, as determined by gas chromatography, is 95%.

EXAMPLES 5 and 6

Following the procedure of Example 4, products are synthesized using the ratios of sodium chloroacetate and perfluoroalkyl iodide as outlined in Table 1.

EXAMPLE 7

A: Synthesis of Poly-allyloxy-PEI 100.0 g (83.3 mmol) of polyethyleneimine Mn 1200 (Epomin®SP-012 from Aceto Corporation) and 20.0 g of deionized water are placed into a round-bottomed flask equipped with a stirrer, nitrogen inlet and a thermoregulator. The temperature of the reaction mixture is increased to 65° C. and 9.51 g (83.3 mmol) of allyl glycidyl ether are added over one hour. The reaction mixture is stirred for two hours at 65° C., after which time conversion of allyl glycidyl ether is complete, as monitored by gas chromatography. This product is not isolated but used directly in the next step.

B: Synthesis of poly-$R_F$-PEI-carboxylic acid 15.0 g (9.6 mmol) of the prepolymer from Example 5A is placed into a round-bottomed flask equipped with a stirrer, nitrogen inlet and a thermoregulator. To this round-bottomed flask is added 11.2 g (96 mmol) of chloroacetic acid sodium salt and 5.0 g of deionized water. The reaction mixture is heated to 75° C. and stirred for three hours. To the round-bottomed flask is added 5.05 g (8.68 mmol) of ZONYL TELA-N along with 0.18 g (0.9 mmol) of sodium metabisulfite and 0.1 g (0.53 mmol) of 2,2'-azobisisobutyronitrile (AIBN). The reaction mixture is stirred under nitrogen at 80° C. for five hours. After five hours the mixture is cooled to room temperature and water is added to adjust the solids to 34% by weight, and 3.6% F. Conversion of R -iodide, as determined by gas chromatography, is 94%.

EXAMPLE 8

A: Synthesis of Poly-allyloxy-PEI 20.0 g (5 mmol) of a 50% by weight aqueous solution of polyethyleneimine of Mn 2000 from Aldrich are placed into a round-bottomed flask equipped with a stirrer, nitrogen inlet and a thermoregulator. The temperature is increased to 65° C. and 2.85 g (25 mmol) of allyl glycidyl ether is added over a one hour period. The reaction mixture is stirred for two hours at 65° C., after which time conversion of allyl glycidyl ether is complete, as monitored by gas chromatography. This product is not isolated but used directly in the next step.

B: Synthesis of poly-$R_F$-PEI-carboxylic acid 13.4 g (11.1 mmol) of the prepolymer from Example 8A are placed into a round-bottomed flask equipped with a stirrer, nitrogen inlet and a thermoregulator. To this are added 3.22 g (27.6 mmol) of chloroacetic acid sodium salt and the reaction mixture is heated to 75° C. and stirred for three hours. Then 5.1 g (10 mmol) of ZONYL TELA-L along with 0.21 g (1.1 mmol) of sodium metabisulfite and 0.09 g (0.45 mmol) of 2,2'-azobisisobutyronitrile (AIBN) are added.

The reaction mixture is stirred under nitrogen at 80° C. for five hours. After five hours the mixture is cooled to room temperature and 100g water are added to adjust the solids to 20% by weight, and 4.2% F. Conversion of $R_F$-iodide, as determined by gas chromatography, is 96%.

EXAMPLE 9

Following the procedure of Example 8 a product is synthesized using ZONYL TELA-N with the $R_F$ distributions as given instead of ZONYL TELA-L.

EXAMPLE 10

A: Synthesis of Poly-allyloxy-PEI)

60.0 g (85.7 mmol) of polyethyleneimine Mn 700 from Aldrich Chemicals and 15 g of deionized water are placed into a flask equipped with a stirrer, nitrogen inlet and a thermoregulator. The temperature of the reaction mixture is increased to 65° C. and 19.56 g (171 mmol) allyl glycidyl ether are added over a period of one hour. The reaction mixture is stirred for two hours at 65° C., after which time conversion of allyl glycidyl ether is complete, as monitored by gas chromatography. This product is not isolated but used directly in the next step.

B: Synthesis of Poly-$R_F$-PEI-carboxylic acid 30 g (54.4 mmol) of the prepolymer from Example 10A are placed into a round-bottomed flask equipped with a stirrer, nitrogen inlet and a thermoregulator. To this are added 25.3 g (218 mmol) of chloroacetic acid sodium salt and 9.5 g of deionized water. The reaction mixture is heated to 75° C. and stirred for three hours. Then 7.7 g (13 mmol) of ZONYL TELA-N along with 0.28 g (1.5 mmol) of sodium metabisulfite and 0.11 g (0.59 mmol) of 2,2'-azobisisobutyronitrile (AIBN) are added. The reaction mixture is stirred under nitrogen at 80° C. for five hours. After five hours the mixture is cooled to room temperature and water is added to adjust the solids to 24% by weight, and 5.1% F. Conversion of $R_F$-iodide, as determined by gas chromatography, is 95%.

EXAMPLE 11

A: Synthesis of Poly-(allyloxy-PEI)

50.0 g (0.04166 mol) of Epomin®SP-012 (polyethyleneimine of Mn 1200 from Aceto Corporation) and 12.5 g of deionized water are placed into a flask equipped with stirrer, nitrogen inlet and a thermoregulator. When a temperature of 65° C. has been reached, 23.77 g (0.2083 mol) allyl glycidyl ether are added over approximately one hour. The reaction mixture is stirred for two hours at 65° C., after which time the reaction is complete, as determined by gas chromatography.

B: Synthesis of poly-$R_F$-PEI-carboxylic acid 25.0 g (0.06036 mol based on double bond equivalent) of product from example 11A and 28.7 g (0.2414 mol) of chloroacetic acid sodium salt are added to a flask equipped with stirrer, nitrogen inlet and a thermoregulator. The reaction mixture is heated to 75° C. and stirred for three hours. At that time 31.61 g (0.0543 mol) (ZONYL TELA-N from DuPont) are added to the mixture along with 1.15 g (6.034 mmol) sodium metabisulfite and 0.46 g (0.241 mmol) 2,2'-azobisisobutyronitrile (AIBN). The mixture is stirred under nitrogen at 80° C. for five hours. At that time the reaction is determined to be complete by gas chromatography. The reaction mixture is diluted with 100 g of deionized water to give a product of 39.6% solids and 9.1% F.

EXAMPLE 12

A: Synthesis of Poly-allyloxy-PEI 100.0 g (0.025 mol) of Lupasol®G-35 (50% polyethyleneimine of Mn 1800 from BASF) are placed into a flask equipped with stirrer, nitrogen inlet and a thermoregulator. When a temperature of 65° C. has been reached, 14.3 g (0.125 mol) allyl glycidyl ether are added over approximately one hour. The reaction mixture is stirred for two hours at 65° C., after which time the reaction is complete, as determined by gas chromatography.

B: Synthesis of poly-$R_F$-PEI-carboxylic acid 41.6 g (0.037343 mol) of the product from example 12A and 17.75 g (0.149 mol) of chloroacetic acid, sodium salt are added to a flask equipped with stirrer, nitrogen inlet and a thermoregulator. The reaction mixture is heated to 75° C. and stirred for three hours. At that time 19.56 g (0.0336 mol) of (ZONYL TELA-N from DuPont) are added to the mixture along with 0.71 g (3.73 mmol) sodium metabisulfite and 0.229 g (1.49 mmol) 2,2'-azobisisobutyronitrile (AIBN). The mixture is stirred under nitrogen at 80° C. for five hours. At that time the reaction is determined to be complete by gas chromatography. The reaction mixture is diluted with 150 g of deionized water to give a product of 26.7% solids having 5.1% F.

EXAMPLE 13

A: Synthesis of Poly-allyloxy-PEI 65.0 g (0.0361 mol) of Lupasol®PR-8515 (polyethyleneimine of Mn 1800 from BASF) and 4.0 g of deionized water are placed into a flask equipped with stirrer, nitrogen inlet and a thermoregulator. The mixture is heated to 65° C. and 18.54 g (0.1625 mol) allyl glycidyl ether are added over approximately one hour. The reaction mixture is stirred for two hours at 65° C., after which time the reaction is complete, as determined by gas chromatography.

B: Synthesis of poly-$R_F$-PEI-carboxylic acid 15.5 g (0.02877 mol) of the product from example 13A and 23.46 g (0.2013 mol) of chloroacetic acid sodium salt are added to a flask equipped with stirrer, nitrogen inlet and a thermoregulator along with 8.2 g deionized water. The reaction mixture is heated to 75° C. and stirred for three hours. At that time 13.0 g (0.02589 mol) of (ZONYL TELA-L from DuPont) are added to the mixture along with 0.55 g (2.88 mmol) sodium metabisulfite and 0.22 g (1.15 mmol) 2,2'-azobisisobutyronitrile (AIBN) and 1.0 g 1-propanol. The mixture is stirred under nitrogen at 80° C. for five hours. At that time the reaction is determined to be complete by gas chromatography. The reaction mixture is diluted with 70 g of deionized water to give a product of 28.6% solids having 5.68% F.

EXAMPLE 14

Synthesis of a $C_6F_{13}$-(allyloxy/iodopropyl)-substituted polyamino-polyacid

A: Synthesis of Poly-allyloxy-PEI)

100 g (0.0833 mol) polyethyleneimine of Mn 1200 (Lupasol®G-20 from BASF) and 7.0 g of deionized water are placed into a flask equipped with stirrer, nitrogen inlet and a thermoregulator. When a temperature of 65° C. is reached, 38.03 g (0.333 mol) allyl glycidyl ether are added over approximately one hour. The reaction mixture is stirred for two hours at 65° C., after which time the reaction is complete, as determined by gas chromatography.

B: Synthesis of poly-N-(2-hydroxy-4-oxa-[6,7-ene and-6-iodo-]-7-perfluorohexyl-heptyl)-N-carboxmethyl poly-(ethyleneimine)

24.6 g (0.0565 mol) of product from Example 14A and 34.57 g (0.2968 mol) of chloroacetic acid sodium salt are added to a flask equipped with stirrer, nitrogen inlet and a thermoregulator along with 12.0 g deionized water. The reaction mixture is heated to 75° C. and stirred for three hours. At that time 22.69 g (0.051 mol) of perfluorohexyl iodide are added to the mixture along with 1.07 g (5.65 mmol) sodium metabisulfite and 0.43 g (2.26 mmol) 2,2'-azobisisobutyronitrile (AIBN) and 2.0g 1-propanol. The mixture is stirred under nitrogen at 80° C. for five hours. At that time the reaction is determined to be complete by gas chromatography. The reaction mixture is diluted with 65.0 g of deionized water and 5.0 g tripropylene glycol monomethyl ether to give a product of 49.0% solids, having 7.5% F.

The compositions of Examples 1–14 are summarized below:

TABLE 1

| Ex. No. | Polyamine | | | | Reactant eq. | | | Ratio of 3° N/2° N/RF/—COOH in product | % bound iodine (Q = Q1) |
|---|---|---|---|---|---|---|---|---|---|
| | MW[1] | 1° | 2° | 3°[2] | AGE | $R_F I$ | COOH | | |
| 1 | 1200 | 7 | 14 | 7 | 3 | 2.7 | 19 | 7/6/2.7/19 | 28 |
| 2 | 1200 | 7 | 14 | 7 | 3 | 2.7 | 10 | 7/15/2.7/10 | 57 |
| 3 | 1200 | 7 | 14 | 7 | 3 | 2.7 | 5 | 7/20/2.7/5 | 10 |
| 4 | 1200 | 7 | 14 | 7 | 2 | 1.8 | 20 | 7/6/1.8/20 | 100 |
| 5 | 1200 | 7 | 14 | 7 | 2 | 1.8 | 10 | 7/16/1.8/10 | 40 |
| 6 | 1200 | 7 | 14 | 7 | 2 | 1.8 | 5 | 7/21/1.8/5 | 17 |
| 7 | 1200 | 7 | 14 | 7 | 1 | 0.9 | 10 | 7/17/0.9/10 | 7 |
| 8 | 2000 | 12 | 23 | 11 | 5 | 4.5[4] | 10 | 11/31/4.5/10 | 27 |
| 9 | 2000 | 12 | 23 | 11 | 5 | 4.5 | 10 | 11/31/4.5/10 | 81 |
| 10 | 700 | 4 | 8 | 4 | 2 | 1.8 | 8 | 4/6/1.8/8 | 49 |
| 11 | 1200 | 7 | 14 | 7 | 5 | 4.5 | 20 | 7/3/4.5/20 | 85 |
| 12 | 1800 | 11 | 20 | 11 | 5 | 4.5 | 20 | 11/17/4.5/20 | 26 |

TABLE 1-continued

| Ex. No. | Polyamine | | | | Reactant eq. | | | Ratio of 3° N/2° N/RF/—COOH in product | % bound iodine (Q = Q1) |
|---|---|---|---|---|---|---|---|---|---|
| | MW[1] | N eq.[2] | | | AGE | R$_F$I | COOH | | |
| | | 1° | 2° | 3°[2] | | | | | |
| 13 | 1800 | 11 | 20 | 11 | 4.5 | 4.5[4] | 32 | 11/6/4.5/32 | 76 |
| 14 | 1200 | 7 | 14 | 7 | 4 | 3.6[5] | 32 | 7/3/3.6/21.0 | 85 |

[1]Number average molecular weight
[2]Estimated primary, secondary and tertiary amines
[3]Total estimated remaining amine content
[4]ZONYL TELA-L
[5]perfluorohexyl iodide.

EXAMPLE 15

Performance of Foam Stabilizers with Sea Water (0.8% F. in formulation)

The efficacy of the compounds as foam stabilizers was determined by preparing an AR-AFFF concentrate by blending the previously mentioned AR-AFFF base formulation at the 0.6% F. level with the foam stabilizers of examples 1–14 at the 0.2% F. level . Foam Expansion Ratio, Quarter Drain Time and Foam Life on Hot 2-Propanol were determined using a premix containing 3% of the concentrate in sea water. An AR-AFFF base sample without foam stabilizer added was used as control (Example 15p). Several examples (1, 4, 8, 10, 11 and 13) showed excellent foam life on hot 2-propanol (>30 minutes).

TABLE 2

| Example | Compound of Example No. | Foam Expansion Ratio | Quarter Drain Time (min) | Foam Life on Hot 2-Propanol (min) |
|---|---|---|---|---|
| 15a | 1 | 6.5 | 10:58 | 46:13 |
| 15b | 2 | 5.6 | 9:39 | 7:30 |
| 15c | 3 | 6.5 | 11:33 | 2:16 |
| 15d | 4 | 6.5 | 11:06 | 37:50 |
| 15e | 5 | 6.6 | 11:21 | 26:53 |
| 15f | 6 | 6.6 | 11:05 | 1:56 |
| 15g | 7 | 6.0 | 9:45 | 6:30 |
| 15h | 8 | 6.3 | 10:25 | 32:50 |
| 15i | 9 | 6.4 | 10:44 | 26:38 |
| 15j | 10 | 6.4 | 11:01 | 35:58 |
| 15k | 11 | 5.8 | 11:22 | 32:30 |
| 15l | 12 | 6.0 | 10:45 | 3:18 |
| 15m | 13 | 6.5 | 10:44 | 30:00 |
| 15n | 14 | 7.0 | 11:53 | 24:16 |
| 15p | control | 7.0 | 9:30 | 0:38 |

EXAMPLE 16

Samples of poly-perfluoroalkyl-substituted poly-(amine-acids) (examples 1, 6, 7, and 9) were evaluated as external paper sizes using the previously described size press application. Oil Kit Numbers are reported at applied fluorine levels.

TABLE 3

| Example | Compound of Example No. | % F | Oil Kit # |
|---|---|---|---|
| 16a | 1 | 0.07 | 3 |
| | | 0.10 | 6 |
| 16b | 6 | 0.07 | 0 |
| | | 0.10 | 2 |

TABLE 3-continued

| Example | Compound of Example No. | % F | Oil Kit # |
|---|---|---|---|
| 16c | 7 | 0.07 | 6 |
| | | 0.10 | 6 |
| 16d | 9 | 0.07 | 6 |
| | | 0.10 | 7 |

EXAMPLE 17

Synthesis of a poly-R$_F$-substituted poly-(amine-sulfonic acid)

A: Synthesis of Poly-allyloxy-PEI)

404.8 g (0.337 mol) polyethyleneimine of Mn 1200 (Lupasol®G-20 from BASF) and 26.68 g of deionized water are placed into a flask equipped with a stirrer, nitrogen inlet and a thermoregulator. When a temperature of 65° C. is reached, 115.47 g (1.012 mol) allyl glycidyl ether are added over approximately one hour. The reaction mixture is stirred for two hours at 65° C., after which time the reaction is complete as determined by gas chromatography.

B: Poly-N-(2-hydroxy-4-oxa-[6,7-ene and-6-iodo-]-7-R$_F$-heptyl)-N-(2-hydroxy-3-sulfonic acid propyl) poly-(ethyleneimine).

16.6 g (0.03071 mol) of the product from Example 17A and 40.2 g (0.1944 mol) of 3-chloro-2-hydroxy-1-propane sulfonic acid sodium salt are added to a flask equipped with a stirrer, nitrogen inlet and a thermoregulator along with 12.0 g deionized water. The reaction mixture is heated to 75° C. and stirred for three hours. At that time 14.0 g (0.0276 mol) perfluoroalkyl iodide (ZONYL TELA-L from DuPont) are added to the mixture along with 0.58 g (3.07 mmol) sodium metabisulfite and 0.24 g (1.23 mmol), 2,2'-azobisisobutyronitrile (AIBN). The mixture is stirred under nitrogen at 80° C. for five hours. At that time the reaction is determined to be complete by gas chromatography. The reaction mixture is then diluted with 25 g of deionized water and 3.25 g of tripropylene glycol monomethyl ether to give a product of 59.6% solids.

EXAMPLE 18

Synthesis of poly-N-(2-hydroxy-4-oxa-[6,7-ene and-6-iodo-]-7-perfluorohexyl-heptyl)-N-carboxymethyl-N-amidomethyl poly-(ethyleneimine).

12.1 g (0.02239 mol) of the product from Example 17A and 8.68 g (0.07455 mol) of chloroacetic acid sodium salt and 6.97 g (0.07455 mol) of 2-chloroacetamide are added to a flask equipped with stirrer, nitrogen inlet and a thermoregulator along with 3.0 g deionized water and 2.1 g (0.027 mol) 50% sodium hydroxide. The reaction mixture is heated to 75° C. and stirred for three hours. At that time 8.99 g (0.0201 mol) of perfluorohexyl iodide are added to the mixture along with 0.48 g (2.01 mmol) sodium metabisulfite, 0.17 g (0.896 mmol) 2,2'-azobisisobutyronitrile (AIBN) and 1.3 g 1-propanol. The mixture is stirred under nitrogen at 80° C. for five hours. At that time the reaction is determined to be complete by gas chromatography. The reaction mixture is diluted with 20.5 g of deionized water and 1.98 g tripropylene glycol monomethyl ether to give a product of 56.9% solids having 7.5% F.

EXAMPLE 19

Synthesis of poly-N-(2-hydroxy-4-oxa-[6,7-ene and-6-iodo-]-7-perfluorohexyl-heptyl)-N-carboxymethyl-N-amidomethyl poly-(ethyleneimine).

11.9 g (0.022 mol) of product from Example 17A, 12.8 g (0.110 mol) of chloroacetic acid sodium salt and 3.49 g (0.0365 mol) of 2-chloroacetamide are added to a flask equipped with stirrer, nitrogen inlet and a thermoregulator, along with 4.0 g deionized water and 1.0 g (0.0125 mol) 50% sodium hydroxide. The reaction mixture is heated to 75° C. and stirred for three hours. At that time 8.84 g (0.0198 mol) of perfluorohexyl iodide (from Hoechst A. G.) are added to the mixture along with 0.42 g (2.2 mmol) sodium metabisulfite, 0.17 g (0.88 mmol) 2,2'-azobisisobutyronitrile (AIBN) and 1.5g 1-propanol. The mixture is stirred under nitrogen at 80° C. for five hours. At that time the reaction is determined to be complete by gas chromatography. The reaction mixture is diluted with 19.0 g of deionized water and 1.95 g tripropylene glycol monomethyl ether to give a product of 52.9% solids having 7.5% F.

EXAMPLE 20

Synthesis of poly-N-(2-hydroxy-4-oxa-[6,7-ene and-6-iodo-]-7-perfluorohexyl heptyl)-N-carboxymethyl-N-amidomethyl-N-(2-hvdroxy-3-trimethylammonium propyl) poly-(ethyleneimine).

11.1 g (0.0205 mol) of product from example 17A, 7.32 g glycidyltrimethylammonium chloride (Quab 151 from Degussa), 7.97 g (0.0685 mol) of chloroacetic acid sodium salt and 3.2 g (0.0342 mol) of 2-chloroacetamide are added to a flask equipped with stirrer, nitrogen inlet and a thermoregulator along with 3.0 g deionized water. The reaction mixture is heated to 75° C. and stirred for three hours. At that time 8.23 g (0.01845 mol) of perfluorohexyl iodide are added to the mixture along with 0.39 g (2.05 mmol) sodium metabisulfite, 0.17 g (0.82 mmol) 2,2'-azobisisobutyronitrile (AIBN) and 0.6 g 1-propanol. The mixture is stirred under nitrogen at 80° C. for five hours. At that time the reaction is determined to be complete by gas chromatography. The reaction mixture is diluted with 18.1 g of deionized water and 1.86 g tripropylene glycol monomethyl ether to give a product of 56.6% solids having 7.3% F.

EXAMPLE 21

Synthesis of poly-N-(2-hydroxy-4-oxa-[6,7-ene and-6-iodo-]-7-perfluorohexyl-hepyl)-N-carboxymethyl-N-triphosphate poly-(ethyleneimine)

15.6 g (0.02889 mol) of the product from example 17A, 14.65 g (0.0479 mol) of sodium trimetaphosphate and 16.8 g (0.144 mol) of chloroacetic acid sodium salt are added to a flask equipped with a stirrer, nitrogen inlet and a thermoregulator along with 7.0 g deionized water. The reaction mixture is heated to 75° C. and stirred for three hours. At that time 13.2 g (0.02597 mol) perfluoroalkyl iodide (ZONYL TELA-L from DuPont) are added to the mixture along with 0.55 g (2.89 mmol) sodium metabisulfite, 0.22 g (1.1 mmol) 2,2'-azobisisobutyronitrile (AIBN) and 1.5 g 1-propanol. The mixture is stirred under nitrogen at 80° C. for five hours. At that time the reaction is determined to be complete by gas chromatography. The reaction mixture is diluted with 34.78 g of deionized water and 3.2 g tripropylene glycol monomethyl ether to give a product of 55.9% solids having 7.1% F.

EXAMPLE 22

Synthesis of poly-N-(2-hydroxy-4-oxa-[6,7-ene and-6-iodo-]-7-$R_F$-heptyl)-N-carboxymethyl-N-triphosphate poly-(ethyleneimine)

16.0 g (0.0296 mol) of the product from Example 17A, 30.18 g (0.0987 mol) of sodium trimetaphosphate from Monsanto and 11.48 g (0.0987 mol) of chloroacetic acid sodium salt are added to a flask equipped with stirrer, nitrogen inlet and a thermoregulator along with 8.0 g deionized water. The reaction mixture is heated to 75° C. and stirred for three hours. At that time 13.55g (0.0266 mol) perfluoroalkyl iodide (ZONYL TELA-L from DuPont) are added to the mixture along with 0.56 g (2.96 mmol) sodium metabisulfite, 0.23 g (1.1 mmol) 2,2'-azobisisobutyronitrile (AIBN) and 1.5 g 1-propanol. The mixture is stirred under nitrogen at 80° C. for five hours. At that time the reaction is determined to be complete by gas chromatography. The reaction mixture is diluted with 24.7 g of deionized water and 3.28 g tripropylene glycol monomethyl ether to give a product of 65.0% solids having 7.18% F.

EXAMPLE 23

Synthesis of poly-N-(2-hydroxy-4-oxa-[6,7-ene and-6-iodo-]-7-$R_F$-heptyl)-N-carboxymethyl-N-2,3-dihydroxypropyl-poly-(ethyleneimine)

20.6 g (0.0381 mol) of the product from Example 17A, 9.81 g (0.127 mol) of glycidol and 15.1 g (0.127 mol) of chloroacetic acid sodium salt are added to a flask equipped with a stirrer, nitrogen inlet and a thermoregulator, along with 7.0 g deionized water. The reaction mixture is heated to 75° C. and stirred for three hours. At that time 17.4 g (0.0349 mol) perfluoroalkyl iodide (ZONYL TELA-L from DuPont) are added to the mixture along with 0.72 g (3.81 mmol) sodium metabisulfite and 0.29 g (1.524 mmol) 2,2-'azobisisobutyronitrile (AIBN). The mixture is stirred under nitrogen at 80° C. for five hours. At that time the reaction is determined to be complete by gas chromatography. The reaction mixture is diluted with 56.1 g of deionized water and 3.9 g tripropylene glycol monomethyl ether to give a product of 47.9% solids having 7.7% F.

EXAMPLE 24

Synthesis of poly-N-(2-hydroxy-4-oxa-[6,7-ene and-6-iodo-]-7-$R_F$-heptyl)-N-amidomethylene-N-triphoshate poly-(ethyleneimine)

16.2 g (0.03 mol) of product from example 17A, 29.0 g (0.0949 mol) of sodium trimetaphoshate from Monsanto and 8.9 g (0.0949 mol) of 2-chloroacetamide are added to a flask equipped with stirrer, nitrogen inlet and a thermoregulator along with 7.0 g deionized water. The reaction mixture is heated to 75° C. and stirred for three hours. At that time 13.7 g (0.027 mol) perfluoroalkyl iodide (ZONYL TELA-L from DuPont) are added to the mixture along with 0.57 g (2.99 mmol) sodium metabisulfite, 0.23 g (1.12 mmol) 2,2'-azobisisobutyronitrile (AIBN) and 2.0 g 1-propanol. The mixture is stirred under nitrogen at 80° C. for five hours. At that time the reaction is determined to be complete by gas chromatography. The reaction mixture is diluted with 26.97 g of deionized water and 3.26 g tripropylene glycol monomethyl ether to give a product of 58.98% solids having 6.98% F.

EXAMPLE 25

Synthesis of poly-N-(2-hydroxy-4-oxa-[6,7-ene and-6-iodo-]-7-$R_F$-heptyl)-N-amidomethyl-poly-(ethyleneimine).

15.1 g (0.0279 mol) of the product from Example 17A and 16.5 g (0.177 mol) of 2-chloroacetamide are added to a flask equipped with a stirrer, nitrogen inlet and a thermoregulator along with 6.0 g deionized water. The reaction mixture is heated to 75° C. and stirred for three hours. At that time 12.8 g (0.0251 mol) of perfluoroalkyl iodide (ZONYL TELA-L from DuPont) are added to the mixture along with 0.53 g (2.79 mmol) sodium metabisulfite, 0.21 g (1.1 mmol) 2,2'-azobisisobutyronitrile (AIBN) and 1.9 g 1-propanol. The mixture is stirred under nitrogen at 80° C. for five hours. At that time reaction is determined to be complete by gas chromatography. The reaction mixture is diluted with 45.4 g of deionized water and 3.0 g tripropylene glycol monomethyl ether to give a product of 43.7% solids having 7.3% F.

EXAMPLE 26
Synthesis of poly-N-(2-hydroxy-4-oxa-[6,7-ene and-6-iodo-]-7-$R_F$-heptyl)-N-amidomethylene-N-2,3-dihydroxypropyl poly-(ethyleneimine)

12.7 g (0.02349 mol) of the product from Example 17A, 5.74 g (0.0744 mol) of glycidol and 6.96 g (0.0744 mol) of 2-chloroacetamide are added a flask equipped with stirrer, nitrogen inlet and a thermoregulator along with 3.0 g deionized water. The reaction mixture is heated to 75° C. and stirred for three hours. At that time 10.7 g (0.0211 mol) of perfluoroalkyl iodide (ZONYL TELA-L from DuPont) are added to the mixture along with 0.47 g (2.35 mmol) sodium metabisulfite, 0.23 g (1.12 mmol) 2,2'-azobisisobutyronitrile (AIBN) and 1.2 g 1-propanol. The mixture is stirred under nitrogen at 80° C. for five hours. At that time the reaction is determined to be complete by gas chromatography. The reaction mixture is diluted with 41.8 g of deionized water and 2.55 g tripropylene glycol monomethyl ether to give a product of 28.8% solids having 7.3% F.

EXAMPLE 27
Synthesis of a poly-$R_F$-poly-(amino sulfonic acid) Poly-N-(2-hydroxy-4-oxa-[6,7-ene and-6-iodo-]-7-RF-heptyl)-N-ethylsulfonic acid poly-(ethyleneimine).
A. Reaction of Polyethyleneimine and Vinylsulfonic Acid Sodium Salt Into a round-bottomed flask is placed 10 g (7.7 mmol) of polyethyleneimine (Luposol®G-20 water-free, Mn=1200 from BASF) along with 49.9 g (92.4 mmol) of vinyl sulfonic acid sodium salt (50% aqueous solution). This mixture is stirred for 12 hours at 80° C. After 12 hours, water is removed by vacuum, giving a yield of 33.2 g (95%).
B. Reaction of AGE with Polyethyleneimine-Vinylsulfonic Acid Sodium Salt Adduct An aqueous solution of 9.0 g (3.8 mmol) of the polyethyleneimine-vinylsulfonic acid sodium salt adduct 27A, dissolved in 5.3 g of deionized water, is heated to 55° C. To this solution is added 0.86 g (7.6 mmol) of AGE (allyl glycidyl ether) dropwise, using an addition funnel. Heating is continued until all the AGE is consumed. Consumption of AGE is monitored by gas chromatography. The product solution is obtained in a yield of 14.9 g (98%).

C. Reaction of the Polyallyloxypolyethyleneimine-polyvinylsulfonic acid salt with Perfluoroalkyl Iodide.

A mixture of 14.9 g (7.4 mmol) polyallyloxypolyethyleneimine-polyvinylsulfonic acid sodium salt) from step B, 4.25 g (7.2 mmol) of perfluoroalkyl iodide (ZONYL TELA-L) and 0.75 g of n-propanol are heated with stirring to 85° C. Simultaneously are added 0.14 g (0.74 mmol) of sodium metabisulfite and 57 mg ( 0.3 mmol) of VAZO®67. This mixture is heated and stirred overnight at 85° C. After stirring overnight, the reaction mixture is diluted with 10 ml of water. The yield is 29.1 g (97%).

EXAMPLE 28
Synthesis of poly-N-2-hydroxy-4-oxa-[6,7-ene and-6-iodo-]-7-$R_F$-heptyl-N-carboxyethyl poly-(ethyleneimine).
A. Reaction of polyethyleneimine with acrylic acid Into a reactor containing 13.0 g (10 mmol) polyethyleneimine (PEI; MW=1200) and 14.0 g deionized water, 8.6 g (119 mmol) acrylic acid is introduced under agitation at 40° C. The mixture is heated to 75° C. and maintained there for 14 hours to give a yellow, viscous, solution. By gas chromatography, the disappearance of acrylic acid is confirmed. The conversion to product is 91%. The structure of the PEI-acrylic acid adduct is verified by $^1$H NMR (500 mhz, CD$_3$OD): δ=3.77, —CH$_2$COO—, 2H), 2.40 (t, —NR$_2$CH$_2$CH$_2$ COO—, 2H), 2.6–3.1 (bm, —NR$_2$CH$_2$CH$_2$NR$_2$—, 4H).
B. Reaction of PEI-acrylic acid adduct with allyl glycidyl ether.

To a reaction flask containing a mixture of 6.3 g (78.5 mmol) 50% sodium hydroxide and 23.3 g (6.54 mmol) of the PEI-acrylic acid adduct from step A, heated to 65° C., are added by syringe 2.2 g (19.6 mmol) allyl glycidyl ether (AGE). After 4.5 hours, GC analysis on a 30 m by 0.53 mm SPB-5 polysiloxane column shows only traces of the epoxide remaining. The structure of the PEI-acrylic acid -allyl glycidyl ether adduct is verified by $^1$H NMR.
C. Reaction of PEI-acrylic acid-AGE adduct with $R_F$-iodide.

To a reaction flask containing 10.2 g (20.8 mmol) PEI-acrylic acid-allyl glycidyl ether adduct from step B are charged 0.1 g (0.654 mmol) sodium metabisulfite, 0.05 g (0.26 mmol) 2,2'-azobis-(2-methylbutyronitrile) (DuPont's VAZO-67), 1.5 g n-propanol, and 10.2 g (20.8 mmol) perfluoroalkyl iodide (DuPont's ZONYL TELA-L) with a homologue distribution of 47.0% C6 $F_{13}$I, 37.2% $C_8F_{17}$I, 11.8% $C_{10}F_{21}$I, 3.0% $C_{12}F_{25}$I, 0.8% $C_{14}F_{29}$I, and 0.2% $C_{16}F_{33}$I. The mixture is heated at 77–80° C. and, after 2 hours another addition of sodium metabisulfite and VAZO-67 (0.1 g and 0.05 g respectively) is made. After 4 additional hours, 2.7 weight % of the perfluoroalkyl iodide is unreacted based on gas chromatography. 39.7 g deionized water are added to the product to give a clear, slightly amber liquid (80.0 g, 95% yield) with a pH of 9.

The compositions of examples 17–28 are summarized in table 4.

TABLE 4

| Ex No. | Polyamine Reactant MWn N eq. $1°/2°/3°^2$ | | | AGE | $R_FI$ | Reactant equivalents HYDROPHILE = HY | Ratio of 3° N/2° N$^3$/RF/HY in product | % bound iodine QF = QF1 |
|---|---|---|---|---|---|---|---|---|
| 17 | 7 | 14 | 7 | 3 | 2.7$^4$ | HPS 19 | 7/6/2.7/19 | 59 |
| 18 | 7 | 14 | 7 | 3 | 2.7$^5$ | CAC 10 + CA 10 | 7/5/2.7/20 | 69 |

TABLE 4-continued

| Ex No. | Polyamine Reactant MWn N eq. 1°/2°/3°[2] | | | AGE | $R_FI$ | Reactant equivalents HYDROPHILE = HY | Ratio of 3° N/2° N[3]/RF/HY in product | % bound iodine QF = QF1 |
|---|---|---|---|---|---|---|---|---|
| 19 | 7 | 14 | 7 | 3 | 2.7[5] | CAC 15 + CA 5 | 7/5/2.7/20 | 76 |
| 20 | 7 | 14 | 7 | 3 | 2.7[5] | QUAB 5 + CAC 10 + CA 5 | 7/5/2.7/20 | 75 |
| 21 | 7 | 14 | 7 | 3 | 2.7[4] | TMP 5 + CAC 15 | 7/5/2.7/20 | 50 |
| 22 | 7 | 14 | 7 | 3 | 2.7[4] | TMP 10 + CAC 10 | 7/5/2.7/20 | 14 |
| 23 | 7 | 14 | 7 | 3 | 2.7[4] | GLY 10 + CAC 10 | 7/5/2.7/20 | 21 |
| 24 | 7 | 14 | 7 | 3 | 2.7[4] | TMP 10 + CA 10 | 7/5/2.7/20 | 21 |
| 25 | 7 | 14 | 7 | 3 | 2.7[4] | CA 19 | 7/6/2.7/19 | n. det. |
| 26 | 7 | 14 | 7 | 3 | 2.7[4] | GLY 10 + ACA 10 | 7/5/2.7/20 | 27 |
| 27 | 7 | 14 | 7 | 2.0 | 1.9[4] | VSA 12 | 7/19/1.9/12 | n. det. |
| 28 | 7 | 14 | 7 | 3 | 2.7 | AA 12 | 7/18/2.7/12 | n. det. |

[1]Number average molecular weight
[2]Estimated ratio of prim., sec., and tert. amino groups
[3]Total estimated remaining secondary amine content
[4]ZONYL TELA-L
[5]Perfluorohexyl iodide
HPS = 3-Chloro-2 hydroxy-1-propane sulfonic acid
CA = 2-Chloroacetamide
CAC = Sodium chloroacetate
QUAB = Glycidyltrimethylammonium chloride (Quab 151)
TMP = Sodium trimetaphosphate
GLY = Glycidol
VSA = Vinyl sulfonic acid
AA = Acrylic acid.

EXAMPLE 29
Performance of Foam Stabilizers with Sea Water (0.8 %F. in formulation)

The efficacy of foam stabilizers was determined by preparing an AR-AFFF concentrate by blending the AR-AFFF base formulation at the 0.6% F. level with the foam stabilizers of Examples 17–28 at the 0.2% F. level. Foam Expansion Ratio, Quarter Drain Time and Foam Life on hot 2-propanol and acetone were determined using 3% premix in salt water. A commercial foam stabilizer, DYNAX 5011 (Dynax Corp., Elmsford, N.Y.), and a AR-AFFF base sample without foam stabilizer added were used as controls (Examples 29i and 29p). The results are summarized in the following table.

TABLE 5

| Ex. No. | Foam Stabilizer Ex. No. | Foam Expansion Ratio | Quarter Drain Time (min) | Foam Life on Hot 2-Propanol (min) | Foam Life on Hot Acetone (min) |
|---|---|---|---|---|---|
| 29a | 17 | 6.7 | 10:26 | 7:44 | 7:18 |
| 29b | 18 | 6.8 | 10:42 | 19:4 | >60 |
| 29c | 19 | 7.0 | 11:04 | 24:4 | >60 |
| 29d | 20 | 7.4 | 10:3 | 25:27 | >48 |
| 29e | 21 | 7.2 | 11:29 | 58:18 | >60 |
| 29f | 22 | 7.0 | 11:02 | 37:19 | >60 |
| 29g | 27 | 6.4 | 9:29 | 24:00 | n. det. |
| 29h | 28 | 6.7 | 12:20 | 15:00 | n. det. |
| 29i | DYNAX 5011 | 7.5 | 10:32 | 26:00 | 50 |
| 29p | NONE | 7.0 | 9:30 | 0:38 | 3:00 |

EXAMPLE 30
Performance of Foam Stabilizers with Tap Water (0.8% F. in formulation)

The efficacy of foam stabilizers was determined by preparing an AR-AFFF concentrate by blending the standard AR-AFFF base formulation at the 0.6% F. level with the foam stabilizers of Examples 17–28 at the 0.2% F. level. Foam Expansion Ratio, Quarter Drain Time and Foam Life on hot 2-propanol and acetone were determined using a 3% premix in tap water. A commercial foam stabilizer, DYNAX 5011, and a AR-AFFF base sample without foam stabilizer added were used as controls (Examples 30i and 30p). The results are summarized in the following table.

TABLE 6

| Ex. No. | Foam Stabilizer Ex. No. | Foam Expansion Ratio | Quarter Drain Time (min) | Foam Life on Hot 2-Propanol (min) | Foam Life on Hot Acetone (min) |
|---|---|---|---|---|---|
| 30a | 17 | 7.2 | 10:55 | 1:33 | 25 |
| 30b | 18 | 7.0 | 10:39 | 34:0 | >60. |
| 30c | 19 | 7.2 | 10:00 | 19:51 | >45 |
| 30d | 20 | 7.8 | 11:00 | 18:3 | >60 |
| 30e | 21 | 8.0 | 10:55 | 31:06 | >60. |
| 30f | 22 | 7.5 | 10:0 | 60:0 | >60 |
| 30g | 27 | 6.9 | 9:39 | 22:00 | n. det. |
| 30h | 28 | 7.5 | 11:22 | 8:40 | n. det. |
| 30i | DYNAX 5011 | 7.3 | 12:00 | 44:00 | >60 |
| 30p | NONE | 8.3 | 8:30 | 0:23 | 18:00 |

EXAMPLE 31

The following example illustrates the synthesis of a foam stabilizer by direct addition of $R_F$-iodide to PEI, followed by reaction with sodium chloroacetate.

A: Reaction of PEI with Perfluoroethyl iodide Synthesis of poly-(N-1,1,2-trihydro-3-fluoro-3-perfluoroalkyl allyl)-ethyleneimine.

At 85° C., 10.0 g (19.0 mmol) perfluoroethyl iodide (ZONYL TELB-L) are added to a clear solution of 8.2 g (195 meqv) polyethyleneimine of Mn 1200 (Lupasol®G-20 from BASF) and 3.0 g hexylene glycol. The mixture is heated to 103° C. with stirring and held there for 6 hours to give a black, viscous product that is water soluble. By gas chromatography (DB-5 column, 30 X 0.53 mm), less than 5 mole percent of the perfluoroethyl iodide remains and 95 mole percent of ionic iodide is obtained as determined by silver nitrate titration. The product is then collected in 97% yield. Spectral data: $^1$H NMR (CD$_3$OD, 500 MHz): 2.6–3.2 (4H, bm, —CH$_2$CH$_2$—), 3.5 (bm, 2 H, —CH$_2$—CH—), 6.02 (1H, bm, —CH=CF—); $^{13}$C NMR (CD$_3$OD, 300 MHz): δ47.3 (—CH$_2$—CH—), 47.5 and 52.4 (—CH$_2$CH$_2$—), 110.1 (CH=CF—), 110.2–120.3 (CF)), 150.5 (—CF=); $^{19}$F (CD$_3$OD, 300 MHz): -83.2 (3F, CF$_3$), -115.4 (2F, F$_2$), -119.6 (2F, F$_7$), —123.1 to -125.4 (8F, C$_3$ to C$_6$), -129.7 (1F, C$_8$).

B: Carboxylation: Synthesis of poly-(N-1,1,2-trihydro-3-fluoro-3-perfluoroalkyl allyl)-(N-carboxamethyl) ethyleneimine.

Sodium chloroacetate (13.3 g, 114.1 mmol) is added to the product mixture obtained above. The reaction mixture is heated at 84° C. for 4–5 hours, at which time a quantitative amount of chloride is obtained based on silver nitrate titration. The water-soluble product is collected in 98% yield. NMR spectroscopy verifies the carboxylation.

EXAMPLE 32

The following example demonstrates the novel low-temperature process for R$_F$-iodide addition to allylic unsaturation, utilizing small amounts dithionite as initiator in the presence of base.

Synthesis of poly-N-2-hydroxy-4-oxa-[-6,7-ene and-6-iodo-]-7-R$_F$-heptyl-N-carboxymethylene poly-(ethyleneimine) (=poly-R$_F$-PEI-carboxylic acid).

15.0 g (24.4 mmol) of the prepolymer from Example 1A are placed into a round-bottomed flask equipped with a stirrer, nitrogen inlet and a thermoregulator and heated to 50° C. Then a solution of 18.0 g (154 mmol) chloroacetic acid sodium salt in 27 g deionized water are added over two hours, during which time the temperature is maintained at 65° C. After two hours 1.71 g (21.3 mmol) 50% sodium hydroxide are added. Completion of the reaction is determined by chloride titration with silver nitrate. The temperature is then lowered to 8° C. and 4.84 g hexylene glycol and 11.11 g (21.9 mmol) perfluoroalkyl iodide (ZONYL TELA-L) are added together with 0.17 g (0.81 mmol) sodium dithionite. After two hours the temperature is increased to 15° C. and stirring is continued for another four hours. Then 0.65 g (8.13 mmol) of a 50% sodium hydroxide solution are added together with 6 g deionized water. The product is obtained in 97% conversion, as determined by gas chromatography, as a 48% aqueous solution with a pH of 7.0–7.4 and containing 7.6% fluorine.

EXAMPLE 33

Performance of Foam Stabilizers in tap and salt water (0.8 % F. in formulation)

The efficacy of the products of example 31 and 32 were determined by blending the Ar-AFFF base formulation at the 0.6% F. level with the foam stabilizers of the examples listed in table 10 at the 0.2% F. level. Foam Expansion Ratio, Quarter Drain Time and Foam Life on hot 2-Propanol and acetone were determined using a 3% premix in salt and tap water. The results are summarized in the following table.

TABLE 7

| R$_F$ Cpd. of Ex. No. | Aqueous System | Foam Expansion Ratio | Quarter Drain Time (min) | Foam Life on Hot 2-Propanol (min) | Foam Life on Hot Acetone (min) |
|---|---|---|---|---|---|
| 31 | tap water | 7.4 | 8:19 | 30:00 | 47:00 |
|    | sea water | 7.4 | 6:50 | 19:00 | >60 |
| 32 | tap water | 7.5 | 8:01 | 4:16 | 22:30 |
|    | sea water | 7.2 | 6:42 | 16:44 | 15:18 |

The following examples demonstrate the effectiveness of the novel foam stabilizers in combination with commercial AR-AFFF and AFFF agents.

EXAMPLE 34

The efficacy of the product of Example 32 was determined by adding 3.2% by weight to commercial AR-AFFF agents. Foam Expansion Ratio, Quarter Drain Time and Foam Life on hot 2-propanol and acetone were determined using a 3% premix in salt and tap water. The results are shown in the following table:

TABLE 8

| | Light Water ATC, 3% 3M Corp. | | MegaFoam AT3 Dainippon Ink Co. | | Ansulite LV 3 × 3 Ansul Inc. | | Universal Gold National Foam | |
|---|---|---|---|---|---|---|---|---|
| | As is | With Cpd. of Ex. 32 | As is | With Cpd. of Ex. 32 | As is | With Cpd. of Ex. 32 | As is | With Cpd. of Ex. 32 |
| 3% Tap Water | | | | | | | | |
| FXR | 8.5 | 8.3 | 6.9 | 7.2 | 9.0 | 8.4 | 8.0 | 7.9 |
| QDT | 5:20 | 5:18 | 2:32 | 2:77 | 0:36 | 2:31 | 10:04 | 9:58 |
| FL/hot IPA | 14:38 | 21:58 | 1:22 | 12:45 | <1 min | 2:25 | 4:15 | 11:50 |
| FL/hot acetone | 36:21 | 14:38 | >1 hr | >1 hr | >1 hr | >1 hr | 45:23 | >1 hr |
| 3% Salt Water | | | | | | | | |
| FXR | 8.0 | 7.6 | 7.6 | 7.3 | 8.0 | 8.1 | 7.3 | 7.4 |
| QDT | 3:48 | 4:00 | 3:02 | 2:41 | 10:42 | 9:52 | 8:07 | 8:49 |
| FL/hot IPA | 5:01 | 15:38 | <1 min | <1 min | 16:43 | 27:25 | 12:25 | 15:08 |
| FL/hot acetone | >1 hr | 18:35 | >1 hr | >1 hr | >1 hr | >1 hr | 22:33 | 28:31 |

FXR = Foam Expansion Ratio; QDT = Quarter Drain Time; FL = Foam Life, all in minutes.

EXAMPLE 35

A 3% AFFF concentrate was prepared containing Lodyne®S-152B, from Ciba Specialty Chemicals Corp., 15% by weight; butyl carbitol 10% and water 75%. To this concentrate 3.2% by weight of the product of example 32 was added and Foam Expansion Ratio, Quarter Drain Time and Foam Life on hot 2-propanol and acetone were determined using a 3% premix in salt and tap water. The unmodified concentrate was used as a control. The results are shown in table 9.

TABLE 9

|   | Tap Water | | Salt Water | |
|---|---|---|---|---|
|   | AFFF concentrate as is | With Cpd. of Ex. 32 | AFFF concentrate as is | With Cpd. of Ex. 32 |
| FXR/QDT | 7.5/8:30 | 7.6/8:12 | 7.4/7:08 | 7.6/6:53 |
| FL on hot IPA | <1 min | 6:00 | <1 min | 17:46 |
| FL on hot acetone | 4:17 | 26:46 | 3:09 | 16:20 |

FXR = Foam Expansion Ratio; QDT = Quarter Drain Time; FL = Foam Life, all in minutes.

What is claimed is:

1. A paper sizing chemical and foam stabilizer which is a perfluoroalkyl-allyloxy- and perfluoroalkyl-iodopropyloxy-substituted polyaminoacid or a poly-$R_F$-fluoroallyl-substituted polyaminoacid, which contains, in random distribution, q units of A-1, r units of A-2, s units of A-3 and t units of A-4 in which A-1 and A-2 are perfluoroalkyl-substituted amino groups of the formulae

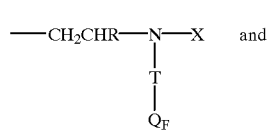

(A-1)

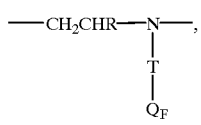

(A-2)

A-3 is a hydrophilically substituted amino or amido group of the formula

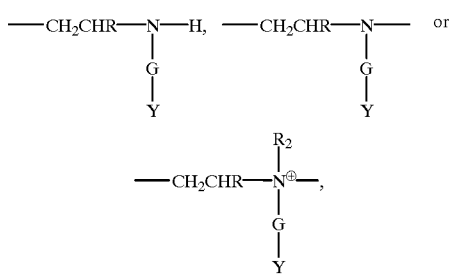

and A-4 is a substituted amino or amido group of the formula

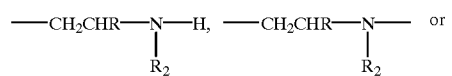

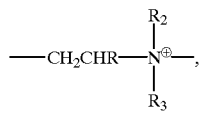

wherein

T is —$CH_2CH(OH)CH_2$—O—$CH_2$— or a direct bond, with the proviso that when T is —$CH_2CH(OH)CH_2$—O—$CH_2$—, $Q_F$ is of the formulae —CHI—$CH_2$—$R_F$ ($Q_{F1}$) and —CH=CH—$R_F$ ($Q_{F2}$)

and consists of 5–50 mole % $Q_{F1}$ and 50–95 mole % $Q_{F2}$, and, when T is a direct bond, $Q_F$, is

—$CH_2$CH=CF—$R_F'$ ($Q_{F3}$), q, r, s, and t are integers from zero to 100, the sum of q+r+s+t is 5 to 200, the sum of q+r is equal or greater than 2, and the ratio of q+r/s is 0.05 to 0.5, R is hydrogen or methyl, $R_F$ is independently a monovalent perfluorinated alkyl or alkenyl, straight or branched organic radical having four to twenty fully fluorinated carbon atoms, $R_F'$ is independently a monovalent perfluorinated alkyl or alkenyl, straight or branched organic radical having three to nineteen fully fluorinated carbon atoms, with each $R_F$ and $R_F'$, radical being identical or different from the other $R_F$ and $R_F'$ radicals, X is hydrogen, —$CH_2CH(OH)CH_2$—O—$CH_2CH=CH_2$ or —G—Y, G is a direct bond or a linking group of the formula —$CH_2$—, —$CH_2CHR$—, —$CH_2$—$CH_2C_6H_4$—, —$CH_2CH_2CH_2$—, —$C_6H_4$—, —CH(—COOH)$CH_2$—, —$CH_2CH_2CONHCH(OH)$—, —$COR_1$—, —$CH_2CHRCONHC(CH_3)_2(CH_2)$—, or a mixture thereof, wherein R is as defined above, $R_1$ is —CH=CH—, —$CH_2CH_2$—, or —$C_6H_4$— and Y is an acid group of the formula —COOH, —$SO_3H$, —$PO_3H_2$, or —$(PO_3H)_3H$, or a salt thereof, or is —$CONH_2$ or —CH(OH)$CH_2$OH, or a mixture of these groups, $R_2$ is an alkyl radical with 1 to 20 carbon atoms, or is —$CH_2CH_2CON(CH_3)_2$, —$CH_2CH_2CONHCH_2OH$, —$CH_2CH_2CON(CH_2OH)_2$, —$CH_2CH_2N(R_4)_2$, —$CH_2CR_1$—$COOR_4$ or —$CH_2CH(OH)CH_2$—O—$CH_2CH=CH_2$, wherein $R_4$ is an alkyl radical with 1 to 18 carbon atoms or —$CH_2CH_2$—OH, $R_3$ is the same as $R_2$ or is hydrogen, and $R_1$ is defined as above.

2. A perfluoroalkyl-allyloxy- and perfluoroalkyl-iodopropyloxy-substituted polyaminoacid or a poly-$R_F$-fluoroallyl-substituted polyaminoacid according to claim 1, wherein $Q_F$ consists of 10–40 % $Q_{F1}$ and 60–90% $Q_{F2}$, or is $Q_{F3}$, $R_F$ is saturated and contains 6–12 carbon atoms, is fully fluorinated and contains at least one terminal perfluoromethyl group, $R_F'$ is saturated and contains 5–11 carbon atoms, is fully fluorinated and contains at least one terminal perfluoromethyl group q+r is 2 to 20, s is 5 to 80 and the ratio of q+r/s is 0.05 to 0.5, t is 0 to 5, R is hydrogen, $R_2$ is —$CH_2CH(OH)CH_2$—O—$CH_2CH=CH_2$, $R_3$ is hydrogen or —$CH_2CH(OH)CH_2$—O—$CH_2CH=CH_2$, Y is as defined in claim 1 and G is a direct bond or is of the formula —$CH_2$—, —$CH_2CH_2$—, —$CH_2CH_2CONHCH(OH)$—, —$CH_2$—$CH_2C_6H_4$—, —CH(—COOH)CH— or —$COR_1$—, where $R_1$ is —$CH_2CH_2$—.

3. A perfluoroalkyl-allyloxy- and perfluoroalkyl-iodopropyloxy-substituted polyaminoacid or a poly-$R_F$-fluoroallyl-substituted polyaminoacid according to claim 2, wherein $Q_F$, T, $R_F$, $R_F'$, q, r, s, t, R, $R_1$, $R_2$, and G are as defined in claim 2 and Y is —COOH or —$CONH_2$.

4. A poly-$R_F$-fluoroallyl-substituted polyaminoacid according to claim 2, wherein $Q_F$ is $Q_{F3}$, T is a direct bond, G is —$CH_2$— and Y is —COOH.

5. A perfluoroalkyl-allyloxy- and perfluoroalkyl-iodopropyloxy-substituted polyaminoacid or a poly-$R_F$-fluoroallyl-substituted polyaminoacid according to claim 2, wherein $Q_F$, T, $R_F$, $R_F'$, q, r, s, t, R, $R_1$ and $R_2$, are as defined in claim 2, G is —$CH_2CH_2$— or —$CH_2$—$CH_2C_6H_4$— and Y is —$SO_3H$.

6. A perfluoroalkyl-allyloxy- and perfluoroalkyl-iodopropyloxy-substituted polyaminoacid or a poly-$R_F$-fluoroallyl-substituted polyaminoacid according to claim 2, wherein $Q_F$, T, $R_F$, $R_F'$, q, r, s, t, R, $R_1$ and $R_2$ are as defined above, G is —$CH_2CH_2$— and Y is —$PO_3H$.

7. A perfluoroalkyl-allyloxy- and perfluoroalkyl-iodopropyloxy-substituted polyaminoacid or a poly-$R_F$-fluoroallyl-substituted polyaminoacid according to claim 2, wherein $Q_F$, T, $R_F$, $R_F'$, q, r, s, t, R, $R_1$ and $R_2$ are as defined in claim 2, G is a direct bond and Y is —$(PO_3H)_3H$, —COOH or —$CH(OH)CH_2OH$.

8. A process for the preparation of a perfluoroalkyl-allyloxy- and perfluoroalkyl-iodopropyloxy-substituted polyaminoacid according to claim 1, which comprises reacting allyl glycidyl ether with primary or secondary amino groups of a polyamine having a number average molecular weight ranging from about 200 to 10,000; then reacting the resulting polyallyloxy-substituted polyamine with an amino-reactive organic or inorganic acidic compound or other hydrophilic compound, and then reacting the product of this reaction with a perfluoroalkyl iodide in the presence of a free radical initiator.

9. A process according to claim 8, wherein the polyamine is a polyalkyleneimine containing 4 to 300 primary, secondary and tertiary amino groups in ratios ranging from 1:1:0 to 1:2:1.

10. A perfluoroalkyl-allyloxy- and perfluoroalkyl-iodopropyloxy-substituted polyaminoacid according to claim 2 wherein $Q_F$ is $Q_{F1}$ and $Q_{F2}$ and consists of 10–40% $Q_{F1}$ and 60–90% $Q_{F2}$, T is —$CH_2CH(OH)CH_2$—O—$CH_2$—, G is —$CH_2$— and Y is —COOH.

11. A method of improving the foam stability and alcohol resistance of an aqueous fire-fighting foam agent, which comprises adding to said agent an effective amount of a compound according to claim 10.

12. A method of improving the foam stability and alcohol resistance of an aqueous fire-fighting foam agent, which comprises adding to said agent an effective amount of a compound according to claim 1.

13. A method of improving the foam stability and alcohol resistance of an aqueous fire-fighting foam agent, which comprises adding to said agent an effective amount of a compound according to claim 2.

* * * * *